Sept. 8, 1953 H. W. HEIN 2,651,290
CLAW FOR MILKING MACHINES
Filed Oct. 26, 1951 2 Sheets-Sheet 1
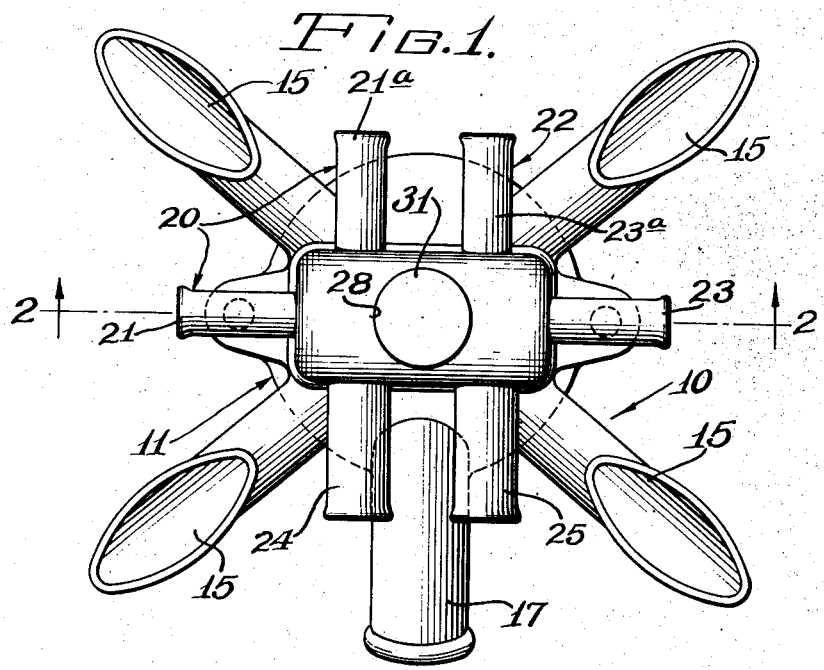
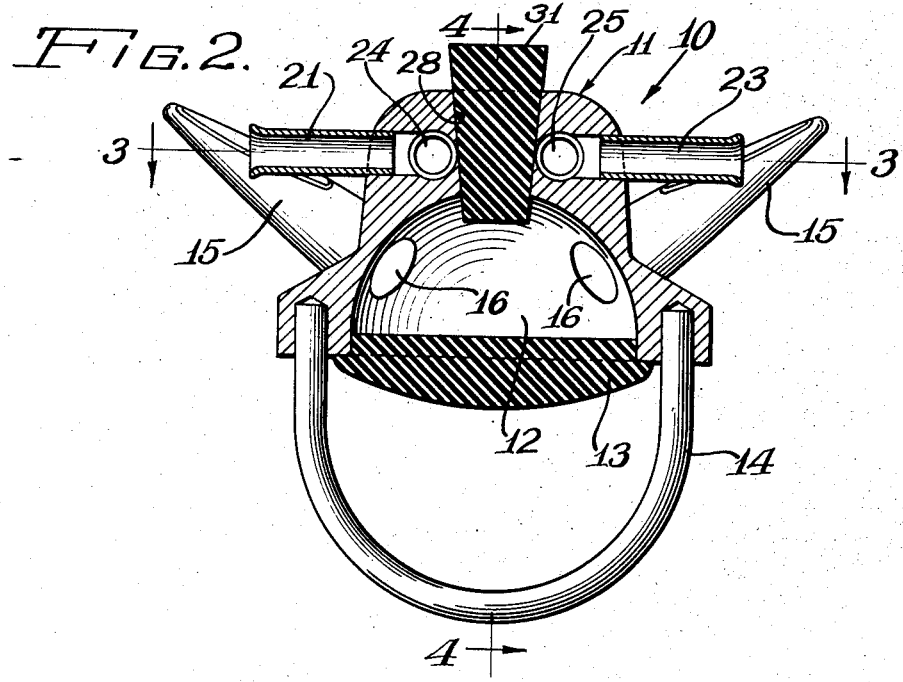
INVENTOR.
Harold W. Hein
BY
Paul O. Pippel Sept. 8, 1953 H. W. HEIN 2,651,290
CLAW FOR MILKING MACHINES
Filed Oct. 26, 1951 2 Sheets-Sheet 2
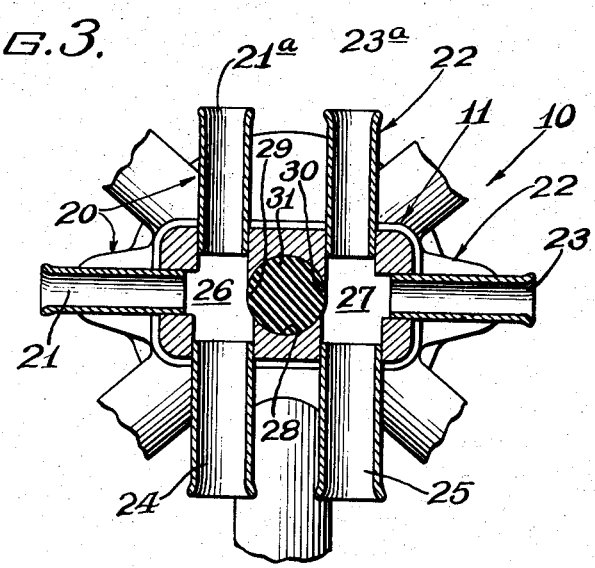
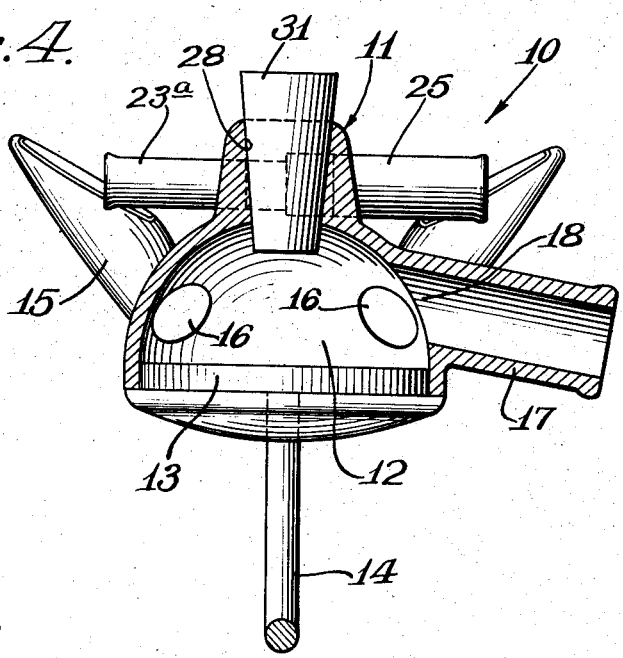
INVENTOR.
Harold W. Hein
BY
Paul O. Pippel Patented Sept. 8, 1953

2,651,290

UNITED STATES PATENT OFFICE 2,651,290

CLAW FOR MILKING MACHINES

Harold W. Hein, Chicago, Ill., assignor to International Harvester Company, a corporation of New Jersey Application October 26, 1951, Serial No. 253,382

7 Claims. (Cl. 119—14.54)

This invention relates to an improvement in a claw for milking machines. More particularly, the invention relates to an improvement in the arrangement of the teat cup connections of a milker claw.

It is a prime object of this invention to provide an improved milker claw having teat cup connections arranged in such a manner to facilitate the cleaning of the claw after use.

Still another object is to provide a milker claw having a plurality of teat cup connections and vacuum and air connections arranged in such a manner that none of the connections have what may be called dead ends within the body, these dead ends existing in conventional claws which are exceedingly difficult to clean.

A still further object is the provision of a milker claw having a plurality of teat cup connections and vacuum and air connections arranged in such a manner, for cleaning purposes, that the connections are positioned to provide uninterrupted passages through the body of the claw so that a brush can be easily pushed into one connection on the body of the claw and will emerge from the body through another connection.

A still further object is to provide a milker claw having a plurality of teat cup connections and a plurality of vacuum and air connections so arranged that each connection is in communication with a diametrically opposed connection to provide a plurality of uninterrupted passageways through the body of the claw.

Another object is to provide a milker claw having several sets of teat cup connections on the body of the claw, the sets being divided by a bore which intersects the connections to provide for communication between the sets during cleaning, the bore being arranged so that a removable plug can be inserted in the bore to block communication between the sets and to provide for normal operation.

A still further object is to provide a milker claw comprising a first set of teat cup connections having a vacuum and air connection in communication therewith, and a second set of teat cup connections having a vacuum and air connection in communication therewith, and a bore through the body of the claw, the bore having openings adapted to provide for communication between the first and second sets of teat cup connections during washing of the claw, and a plug which is adapted to be normally seated in the bore for blocking such communication during the normal milking operation.

These and further objects will become more readily apparent from a reading of the specification when examined in connection with the accompanying sheets of drawings:

In the drawings:

Fig. 1 is a plan view of a milker claw embodying the features of the invention;

Fig. 2 is a sectional view through a milker claw, the view being taken along the line 2—2 of Fig. 1;

Fig. 3 is a cross-sectional view through a milker claw showing the arrangement of teat cup connections and vacuum and air connections, the view being taken substantially along the line 3—3 of Fig. 2;

Fig. 4 is a sectional view through a milker claw taken along the line 4—4 of Fig. 2.

Referring now particularly to Figs. 1, 2 and 4, a milker claw is generally designated by the reference character 10. The milker claw 10 includes a body 11 having a centrally disposed semi-spherical milk receiving chamber 12. The milk receiving chamber 12 is provided with a closure member or cap 13 shaped to conform to the chamber 12 for closing the same from the atmosphere. The milker claw 10 is shown in these figures in the position in which it is normally used during a milking operation. A bail shaped handle 14 is suitably connected to the lower end of the body 11, this handle permitting the claw 10 to be suitably suspended when not in use.

The body 11 is provided with a plurality of milk hose connections or nipples 15 which open inwardly into the chamber 12 as indicated at 16. The milk hose connections 15 are adapted to connect to a plurality of flexible hoses (not shown), the hoses in turn being connected to a series of teat cups and to the interior of the inflations which are positioned in the teat cups. Milk from the animal flows into the flexible milk hoses and through the connections 15 into the chamber 12 during the normal milking operation.

The present claw 10 is particularly well adapted to a pulsator having an alternating vacuum and air operation. The claw may be utilized to subject the udder of the cow to a two-way milking action. In a two-way milking action, two of the teat cups have the space between the wall of the teat cups and the rubber inflations subjected to a vacuum while the other two teat cups have the space between the inflations and the wall of the teat cups subjected to atmosphere. This is distinguished from a milking action wherein all four of the teat cups are subjected to the vacuum action simultaneously.

The present milk receiving chamber 12 is in communication with a milk line connection 17 opening inwardly into the chamber 12 as indicated at 18 in Fig. 4. The milk line connection 17 is generally connected to a flexible hose which, in turn, is connected to the petcock situated on a milker pail for delivering milk directly into the pail. The connections from the milk line connection 17 have not been shown since they form no part of the present invention.

The body 11 is provided with a first pair of teat cup connections 20, the first pair 20 including teat cup connections 21 and 21a which are disposed in right angle relation with respect to each other. The body 11 is also provided with a second pair of teat cup connections generally designated at 22, the second pair of teat cup connections 22 including teat cup connections 23 and 23a which are positioned at relatively a right angle with respect to each other. The two pairs of teat cup connections 20 and 22 are so positioned on the body 11 that the teat cup connection 21a is positioned in substantially parallel relationship with respect to the teat cup connection 23a. The teat cup connection 21 is positioned in diametrically opposed relationship with respect to the teat cup connection 23. This arrangement of the teat cup connections is particularly well shown in Fig. 3.

A vacuum and air connection 24 extends outwardly of the body 11 and is positioned in diametrically opposed relationship with respect to the teat cup connections 21a. A vacuum and air connection 25 projects outwardly from the body 11 in substantially parallel relation with respect to the vacuum and air connection 24, the vacuum and air connection 25 being positioned in diametrically opposed relation with respect to the teat cup connection 23a of the pair of teat cup connections 22. Within the body, a T-shaped conduit 26 is in communication with the teat cup connections 21 and 21a and with the vacuum and air connection 24 in such a manner that communication between these connections exists. A T-shaped conduit 27 is provided within the body 11, the conduit 27 providing for communication between the teat cup connections 23 and 23a and the vacuum and air connection 25.

The teat cup connection arrangement can also be described in the following manner: A first set, consisting of teat cup connections 21a and 23a extends outwardly of the body, the connections 21a and 23a extending in parallel relation. The connections 21a and 23a are diametrically opposed with respect to connections 24 and 25. A second set consisting of teat cup connections 21 and 23, has the connections 21 and 23 positioned in diametrically opposed relation. Thus each connection has another connection positioned in diametrically opposed relation. (This separation of the teat cup connections into "sets" has no significance with respect to operation but the terminology is used merely in an identfying manner.)

An axially extending bore 28 is positioned in the body 11. The bore 28 is open at one end to the atmosphere and is open at its other end to the interior of the chamber 12. The bore 28 is positioned between and separates the first pair of teat cup connections 20 and the second pair of teat cup connections 22. As best shown in Fig. 3, the bore 28 is provided with oppositely disposed openings 29 and 30 which are respectively in communication with the T-shaped conduits 26 and 27. As best shown in Figs. 2, 3 and 4 a resilient or rubber-like plug 31 is disposed within the bore 28 thus suitably blocking the openings 29 and 30 and sealing the chamber 12 with respect to the bore 28.

During use of the milker claw 10 in the milking operation, both pairs of teat connections 20 and 22 are suitably connected to teat cup casings (not shown). The plug 31 is in place within the bore 28 so that the openings 29 and 30 are suitably blocked. The vacuum and air connections 24 and 25 are alternately subjected to vacuum and atmosphere through the action of a pulsator and the milking operation progresses in the conventional manner. Milk flows into the chamber 12 through the milk line connections 15 from where it is conducted to a milk can through the milk line connection 17 and through a flexible hose (not shown).

The arrangement of the teat cup connections 20 and 22 with respect to the vacuum and air connections 24 and 25 have particular significance. The importance of the arrangement lies in the fact that the claw 10 can be very easily and effectively cleansed or washed after the milking operation has been completed. In the conventional type of claw the teat cup connections and the vacuum and air connections are so arranged that certain of the passages within the claw are provided with dead ends. It is, of course, immediately obvious that such an arrangement is exceedingly difficult to wash since milk residue may remain in the dead ends of the passages and this residue will very likely contaminate the claw. In applicant's present invention no dead ends for any of the passages are apparent. Each connection on the body of the claw is so arranged that it is in diametrically opposed relation with respect to another connection and may be placed into communication therewith so that a brush can be pushed into one connection, the brush emerging from the body through another connection. Thus, a straight-through cleaning is effective without the possibility of damaging milk residue remaining in the body of the claw.

When the claw is prepared for washing, the plug 31 is removed from the bore 28. Thus, it can be seen that now the teat cup connection 21 is in direct communication by means of the openings 29 and 30 with the teat cup connection 23 which is disposed in diametrically opposed relation. The operator, therefore, can readily push a brush through one end of the teat cup connection 21 and push it completely through the body of the claw, the brush emerging from the other teat cup connection 23. It can also be seen that the operator can wash the vacuum and air connections in the same manner by simply pushing a brush straight through either of the vacuum and air connections, the brush emerging from the body through the teat cup connections 21a and 23a which are disposed in diametrically opposed relationship with respect to the vacuum and air connections 24 and 25. The bore 28 can very easily be cleaned by simply pushing a brush through from one end, the brush going completely through the bore and into the chamber 12 and out of the open end of the chamber. When the milker claw has been thoroughly cleaned in this manner the plug 31 is again placed in the bore 28 and the milker claw is again ready for use.

It can now be seen that when the plug 31 is removed from the bore 28 all of the passages or connections of the claw are in communication. This communication is in a straight line direction so that all passages have another passage or connection in diametrically opposed relation to provide completely unobstructed straight-through passages within the body 11. Thus, a teat cup claw has been provided which is particularly easy to wash and which can be effectively cleaned by simply inserting a brush through any one of the teat cup connections or atmosphere and vacuum connections and by pushing the brush completely through the body of the claw. By the arrangement shown no dead ends or pockets are provided in any of the connections or passages.

It can now be seen that the objects of the invention have been fully accomplished and that an improvement in milker claws has been made. It must be understood that changes and modifications may be made without departing from the spirit of the invention as disclosed nor from the scope thereof as defined in the appended claims.

What is claimed is:

1. A teat cup claw for milker units comprising a body having a central chamber open at one end, a closure member for closing the opening of the chamber, a plurality of milker hose nipples in communication with the chamber and projecting radially outwardly from the body, a first pair of teat cup connections on said body, said first pair of teat cup connections including first and second teat cup connections extending at a substantially right angle direction with respect to each other, a second pair of teat cup connections on said body, said second pair of teat cup connections including first and second teat cup connections extending at a substantially right angle direction with respect to each other, the first teat cup connections extending substantially in parallel relation, the second teat cup connections being diametrically opposed with respect to each other, a pair of vacuum and air connections on the body, the vacuum and air connections being positioned in diametrically opposed relation with respect to the first teat cup connections, first and second conduit means in said body, one conduit means providing communication between the first pair of teat cup connections and one of the vacuum and air connections, and a second conduit means providing communication between the second pair of teat cup connections and the other vacuum and air connection, said body having an axially extending bore, said bore having an opening adapted to communicate with the atmosphere and an opening adapted to communicate with the chamber, and a resilient plug normally contained in said bore during the milking operation, said plug being removable and said bore having portions thereof intersecting said first and second conduit means whereby all of said conduit means, said teat cup connections, vacuum and air connections and said chamber are in communication.

2. A teat cup claw for milker units comprising a body having a chamber open at one end, a closure member for closing the opening of the chamber, a plurality of milker hose nipples in communication with the chamber and projecting radially outwardly from the body, a first pair of teat cup connections on said body, said first pair of teat cup connections including first and second teat cup connections extending at a substantially right angle direction with respect to each other, a second pair of teat cup connections on said body, said second pair of teat cup connections including first and second teat cup connections extending at a substantially right angle direction with respect to each other, the first teat cup connections extending substantially in parallel relation, the second teat cup connections being diametrically opposed with respect to each other, a pair of vacuum and air connections on the body, the vacuum and air connections being positioned in diametrically opposed relation with respect to the first teat cup connections, first and second conduit means in said body, one conduit means providing communication between the first pair of teat cup connections and one of the vacuum and air connections, and a second conduit means providing communication between the second pair of teat cup connections and the other vacuum and air connection, said body having an axially extending bore, said bore having an opening adapted to communicate with the atmosphere, and a resilient plug normally contained in said bore during the milking operation, said plug being removable and said bore having portions thereof intersecting said first and second conduit means whereby said conduit means, said teat cup connection and vacuum and air connections are in communication.

3. A teat cup claw for milker units comprising a body having a chamber open at one end, a closure member for closing the opening of the chamber, a plurality of milker hose nipples in communication with the chamber and projecting radially outwardly from the body, a first pair of teat cup connections on said body, said first pair of teat cup connections including first and second teat cup connections extending at a substantially right angle direction with respect to each other, a second pair of teat cup connections on said body, said second pair of teat cup connections including first and second teat cup connections extending at a substantially right angle direction with respect to each other, the first teat cup connections extending substantially in parallel relation, the second teat cup connections being diametrically opposed with respect to each other, a pair of vacuum and air connections on the body, the vacuum and air connections being positioned in diametrically opposed relation with respect to the first teat cup connections, first and second conduit means in said body, one conduit means providing communication between the first pair of teat cup connections and one of the vacuum and air connections, and a second conduit means providing communication between the second pair of teat cup connections and the other vacuum and air connection, said body having an axially extending bore, said bore having an opening adapted to communicate with the atmosphere, and a resilient plug normally contained in said bore during the milking operation, said plug being removable and said bore having portions thereof intersecting said first and second conduit means whereby said conduit means and said teat cup connections are in communication.

4. A teat cup claw for milker units comprising a body having a milk receiving chamber, a plurality of milk hose nipples in communication with the chamber, said body having a bore adapted to communicate with the chamber, a first set of teat cup connections positioned laterally at one side of the bore, a second set of teat cup connections positioned laterally at an opposite side of the bore, said bore having openings in communication with said teat cup connections whereby said sets of teat cup connections and the chamber are adapted to communicate with each other, and a plug removably positioned in said bore for blocking communication between the sets of teat cup connections and between said chamber and said connections.

5. A teat cup claw for milker units comprising a body having a milk receiving chamber, a plurality of milk hose nipples in communication with the chamber, said body having a bore, a first set of teat cup connections positioned laterally at one side of the bore, said first set including a first vacuum and air connection, a second set of teat cup connections positioned laterally at an opposite side of the bore, said second set including a second vacuum and air connection, said bore having openings in communication with said teat cup connections whereby said sets of teat cup connections are adapted to communicate with each other, each connection of the first set being diametrically opposed to a connection of the second set to provide a plurality of aligned straight-through passages and means removably positioned in said bore for blocking communication between the sets of teat cup connections.

6. A teat cup claw for milker units comprising a body having a milk receiving chamber, a plurality of milk hose nipples in communication with the milk receiving chamber, a plurality of teat cup connections connected to said body, a plurality of vacuum and air connections connected to said body, a bore having openings within the body connecting the vacuum and air connections with the teat cup connections to provide for communication therebetween, each connection being disposed in diametrically opposed relation with respect to another connection to provide a plurality of uninterrupted straight-through aligned passageways through said body, and means movable in said bore to block communication between certain of said connections.

7. A teat cup claw in accordance with claim 6, said movable means including a plug adapted to be inserted in said bore for closing the openings of said bore and for blocking communication between certain of said connections.

HAROLD W. HEIN.

References Cited in the file of this patent

UNITED STATES PATENTS

| Number | Name | Date |
|---|---|---|
| 784,780 | Burrell | Mar. 14, 1905 |
| 1,018,846 | Mitchell | Feb. 27, 1912 |
| 1,218,125 | Sharples | Mar. 6, 1917 |
| 1,261,780 | Dinesen | Apr. 9, 1918 |
| 1,468,238 | King | Sept. 18, 1923 |
| 1,479,014 | Stampen | Jan. 1, 1924 |
| 1,491,792 | Dinesen | Apr. 29, 1924 |
| 1,891,983 | Hodsdon | Dec. 27, 1932 |

FOREIGN PATENTS

| Number | Country | Date |
|---|---|---|
| 489,780 | Germany | Jan. 22, 1930 |